UNITED STATES PATENT OFFICE.

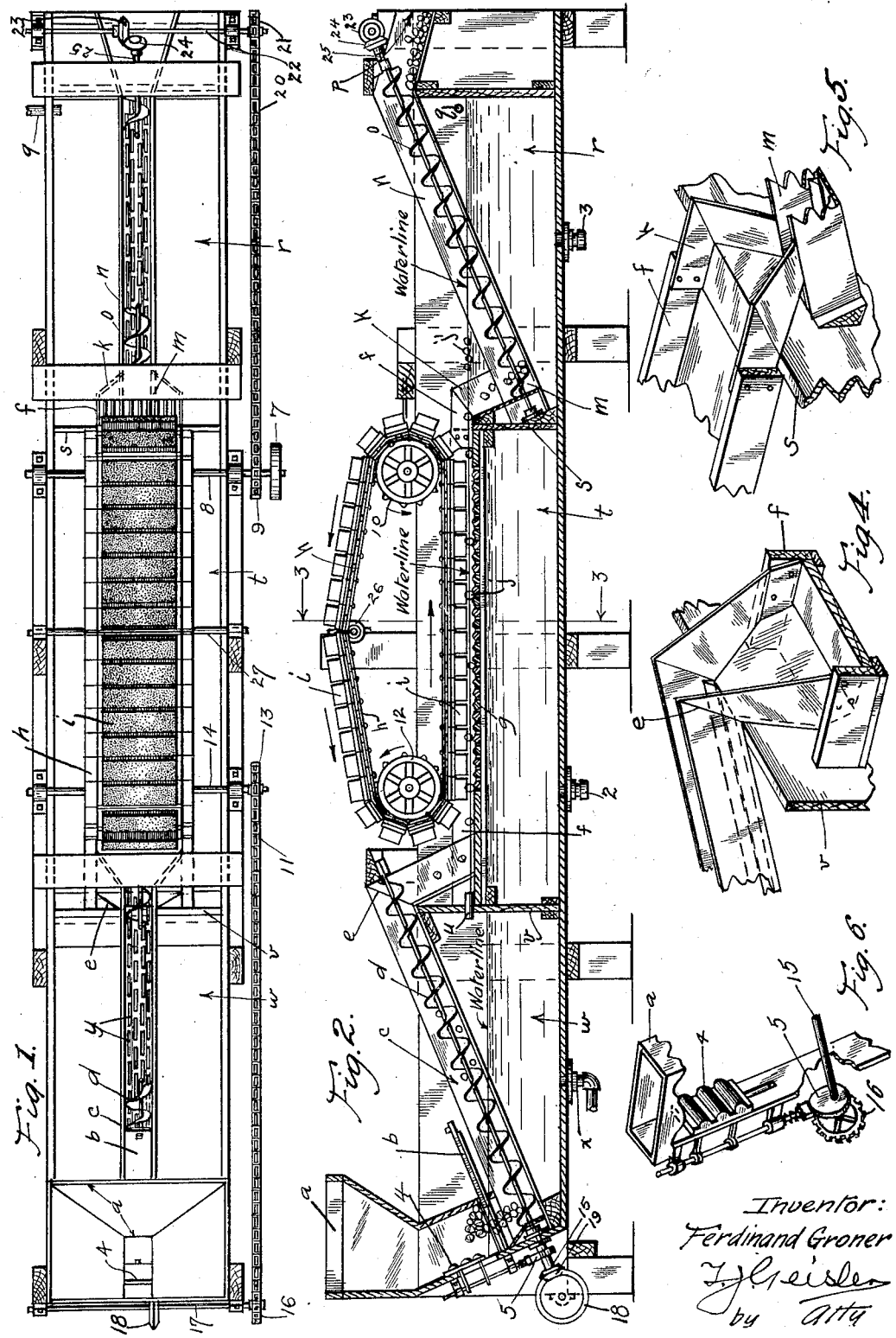

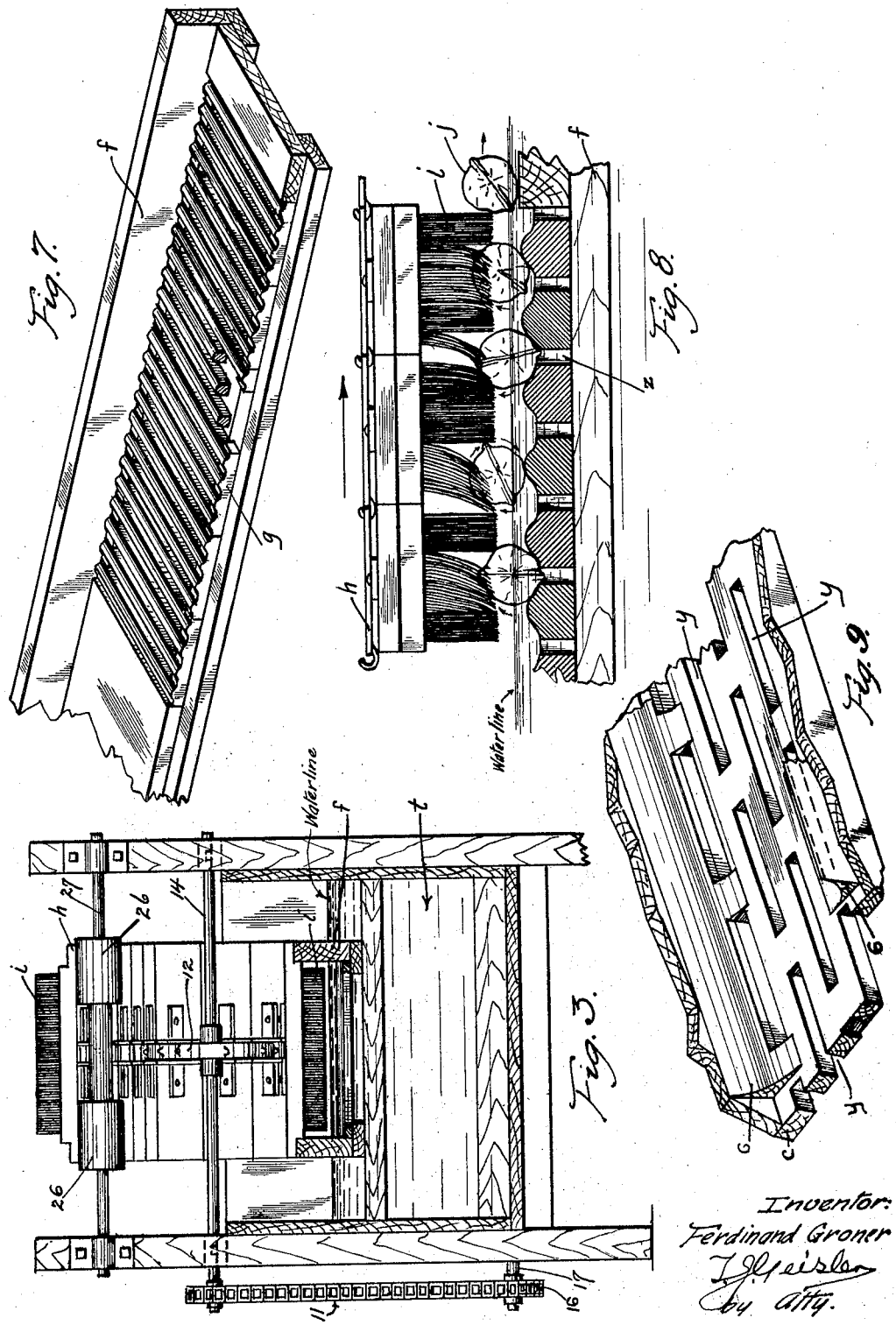

FERDINAND GRONER, OF HILLSBORO, OREGON.

NUT-WASHING MACHINE.

1,387,257.  Specification of Letters Patent.  Patented Aug. 9, 1921.

Application filed April 6, 1921. Serial No. 458,979.

*To all whom it may concern:*

Be it known that I, FERDINAND GRONER, a citizen of the United States, and a resident of Hillsboro, county of Washington, and State of Oregon, have invented a certain new and useful Improvement in Nut-Washing Machines, of which the following is a specification.

The object of my invention is to provide a machine which will thoroughly clean nuts, especially walnuts, and which machine, furthermore, shall be of simple construction, and easily operated, and easily kept clean and in order.

I attain my object by providing a machine that embodies devices functioning to scrub and rinse the nuts, and provide means for keeping the water clean, thereby keeping the scrubbing brushes free from the dirt scrubbed and washed from the nuts.

My machine comprises a series of three vats, which are kept partly filled with water flowing from a head.

A hopper is located over one vat and discharges into a spiral conveyer, one of which dips into the water of this receiving vat and the other end discharges onto the scrubbing table provided in the intermediate vat.

While the nuts are being carried forward by the conveyer in the receiving vat the nuts are, of course, tumbled about in the water and in this way have the muck and dirt which adheres to them softened and loosened so that it may be more readily removed by the brushes operating in the intermediate vat.

The nuts are scrubbed on said table to remove from them the adhering dirt; and in the vat at the discharge end of my machine the nuts are rinsed, and then automatically lifted out of this vat by means of a suitable conveyer and discharged onto a chute, which in practice, discharges into a suitable receptacle.

A continuous flow of water is provided for the discharge vat, and the water flows through the series of vats toward the vat at the receiving end of the machine, hence this vat will receive the bulk of the dirt adhering to the nuts, and the water in the latter vat has a continuous out flow, thus preventing the water in this tank from becoming too dirty for effective work. The arranging of the trough of water into three bodies or vats and the stepping of the water levels functions to prevent the dirt from one body floating into the adjoining vat. It also serves to keep the water in the intermediate vat at a proper level relative to the planes of the scrubbing table and the scrubbing brushes acting on the nuts. The rinsing vat at the discharge end of my machine receiving the fresh water is thus kept clean, as necessary for the final rinsing of the scrubbed nuts.

Another feature of my machine is that the scrubbing brushes do not work in water, for if the brushes drag in the water they use up an undue amount of power, particularly so since they move against the current of the water flowing from one vat to the other.

Other special features of my invention are hereinafter set forth in detail. The accompanying drawings illustrate the principle of construction and operation governing my invention, in which:

Figure 1 is a general plan of my machine in its entirety;

Fig. 2 is a diagrammatical longitudinal section of the same;

Fig. 3 is a transverse section on the line 3—3 of Fig. 2 as viewed in the direction of the arrows, this view being drawn on a larger scale than the preceding figures;

Fig. 4 is an isometric perspective of the upper end of the trough of the first conveyer;

Fig. 5 is an isometric perspective of the discharging end of the scrubbing trough, showing the spout leading into the lower end of the second trough of the second conveyer;

Fig. 6 is an isometric perspective of the agitator on the interior side of the receiving hopper; that is to say, the hopper into which the nuts to be washed are thrown;

Fig. 7 is an isometric perspective of the scrubbing table, and riffles provided on the latter;

Fig. 8 is a detail showing a side elevation of a section, or part of the endless chain of scrubbing brushes, illustrating the coöperation thereof with the riffles on the scrubbing table; and Fig. 9 is an isometric perspective showing a detail of construction of the troughs in which the conveyers work.

The nuts are placed in the receiving hopper *a*, and are permitted to drop through slide-gate *b* into the trough *c* of the spiral conveyer *d*, the lower end of the trough extending into the water of the first vat *w*. In this vat dirt on the nuts is soaked and loosened. From the vat *w* the nuts are carried by the conveyer into the second or middle vat, falling from the upper end *e* of the conveyer onto the scrubbing table *f*, and rolling, as a result of the momentum gained in their fall, onto or close to the scrubbing riffles *g*. *h* represents an endless chain of scrubbing brushes *i*, which revolves in the direction indicated by the arrow in Fig. 2. This chain of brushes *i* scrubs the nuts *j* as it rolls them along the scrubbing riffles *g*. From the end of the scrubbing riffles *g* the nuts fall into the lower end *m* of the trough *n*, of the second conveyer *o*, where they are rinsed, and from here the nuts are carried up by the spiral propeller and discharged from the machine at opening *p* onto an inclined chute *p'*.

*j'* represents empty nuts which float, and which thus may be removed by hand.

Water is admitted, through the supply pipe *q*, into the rinsing vat *r* until it overflows the partition *s*, into the scrubbing vat *t* and fills the latter to the openings *u* in the partition *v*, through which the water enters and fills the vat *w*. The opening *u* is located at such height that the water level in the vat *t* is kept approximately half way between the scrubbing riffles *g* and the brushes *i* as illustrated in Fig. 8. In this way the nuts *j* are continually tumbeled in the water and rinsed while being scrubbed and the brushes *i* do not dip and drag in the water, which would tend to consume an undue amount of power because of the dragging against the flow of the water in the vat *t*.

The water in the receiving vat *w* is kept at a level just below the level of water in the vats *t* and *r* by the adjustment of the out flow of the valve *x*.

Most of the dirt scrubbed from the nuts in the scrubbing-vat *t* floats through the openings *u* into the receiving vat *w*, and the remainder sinks to the bottom, hence the nuts are scrubbed in water which is practically clean.

Slots *y* are provided in the troughs *c* and *n* of the spiral conveyers, as illustrated in Fig. 9; and slots *z* between the scrubbing riffles *g*, as illustrated in Fig. 8 which permits the water to fill the trough *t* at their lower ends, and also prevents the dirt from collecting on the scrubbing table, since if not washed away by the current of water passing through the trough *t* it will fall through the slots of the scrubbing table.

Valves 2 and 3 are provided in the bottoms of the scrubbing and rinsing vats, *t* and *r*, so that these may be drained and cleaned as required.

4 represents an agitator (see Fig. 6) reciprocated by a cam 5, and which functions to prevent the nuts from clogging in the receiving hopper *a*.

The conveyer troughs *c* and *n* are preferably made with concave corners 6 to prevent dirt from collecting in the corners. The troughs are built just large enough in cross section to permit the dirt to slide down under the blades of the conveyer but yet not permit the nuts to crowd in between the periphery of the blades and the sides of the trough.

Power is applied to pulley 7, (see Figs. 1 and 2) thus rotating the shaft 8 on which are sprocket-wheels 9 and 10. A sprocket chain *h* travels on sprocket wheels 10 and 12, the former being on the shaft 8, and the sprocket-chain *h* carries the brushes *i*. The sprocket-chain *h* runs over a roller 26 mounted on a shaft 27. On the shaft 14 of the sprocket-wheel 12 is also mounted another sprocket wheel 13 connected by a sprocket-chain 11, with a sprocket wheel 16 on the shaft 17 rotating the latter and rotating the shaft 15 of the spiral conveyer *d* through the medium of bevel gears 18 and 19. In like manner the spiral conveyer *o* is rotated through the medium of sprocket chain 20 connecting the sprocket wheel 9 with the sprocket wheel 21 on shaft 22 from which power is transmitted through the medium of the bevel gears 23 and 24.

Of course the specific means for applying the power to operate the respective devices are not material, but may be left to the convenience of the constructor of my device.

I claim:

1. A washing machine of the character described comprising, a trough divided into a receiving section, an intermediate section and a discharge section, means holding the water contained in said sections in levels stepped downward from the discharge section toward the receiving section, a hopper discharging into the receiving section, a conveyer having an end located under said hopper and in the water, a table in the intermediate section such table having transverse riffles, a chain of brushes supported for being moved longitudinally over said table, means for driving said brushes, said conveyer discharging onto the riffled table.

2. A washing machine of the character described comprising, a trough divided into a receiving section, an intermediate section and a discharge section, means holding the water contained in said sections in levels stepped downward from the discharge section toward the receiving section, a hopper discharging into the receiving section, a spiral conveyer having an end located under said hopper and in the water, the conveyer having a trough of conforming cross area and provided with draining apertures, a table in the intermediate section, such table having transverse riffles, a chain of brushes supported for being moved longitudinally over said table, means for driving said brushes, said conveyer discharging onto the riffled table.

3. A washing machine of the character described comprising, a trough divided into a receiving section, an intermediate section and a discharge section, means holding the water contained in said sections in levels stepped downward from the discharge section toward the receiving section, a hopper discharging into the receiving section, a conveyer having an end located under said hopper and in the water, a table in the intermediate section, such table having transverse riffles and apertures between the riffles, a chain of brushes supported for being moved longitudinally over said table, means for driving said brushes, said conveyer discharging onto the riffled table.

4. A washing machine of the character described comprising, a trough divided into a receiving section, an intermediate section and a discharge section, means holding the water contained in said sections in levels stepped downward from the discharge section toward the receiving section, a hopper discharging into the receiving section, a conveyer, having an end located under said hopper and in the water, a table in the intermediate section, such table having transverse riffles and apertures between the riffles, a chain of brushes supported for being moved longitudinally over said table, means for driving said brushes, said conveyer discharging onto the riffled table, the brushes moving in a plane spaced from the top of said table and toward the discharging section.

5. A washing machine of the character described comprising, a trough divided into a receiving section, an intermediate section and a discharge section, means holding the water contained in said sections in levels stepped downward from the discharge section toward the receiving section, a hopper discharging into the receiving section, a conveyer having an end located under said hopper and in the water, a table in the intermediate section, such table having transverse riffles and apertures between the riffles, a chain of brushes supported for being moved longitudinally over said table, means for driving said brushes, said conveyer discharging onto the riffled table, the brushes moving in a plane spaced from the top of said table and toward the discharging section, and a second conveyer in the latter section, such conveyer to receive the discharge from the riffled table.

6. A washing machine of the character described comprising, a trough divided into a receiving section, an intermediate section and a discharge section, means holding the water contained in said sections in levels stepped downward from the discharge section toward the receiving section, a hopper discharging into the receiving section, a spiral conveyer having an end located under said hopper and in the water, the conveyer having a trough of conforming cross area and provided with draining apertures, a table in the intermediate section, such table having transverse riffles and apertures between the riffles, a chain of brushes supported for being moved longitudinally over said table, means for driving said brushes, said conveyer discharging onto the riffled table, the brushes moving in a plane spaced from the top of said table and toward the discharging section, and a second conveyer in the latter section, such conveyer adapted to receive the discharge from the riffled table.

7. A washing machine of the character described comprising, a trough divided into a receiving section, an intermediate section and a discharge section, means holding the water contained in said sections in levels stepped downward from the discharge section toward the receiving section, a hopper discharging into the receiving section, a conveyer having an end located under said hopper and in the water, a table in the intermediate section, such table having transverse riffles, a chain of brushes supported for being moved longitudinally over said table, means for driving said brushes, said conveyer discharging onto the riffled table, and a second conveyer in the latter section, such conveyer adapted to receive the discharge from the riffled table.

8. A washing machine of the character described comprising, a trough divided into a receiving section, an intermediate section and a discharge section, means holding the water contained in said sections in levels stepped downward from the discharge section toward the receiving section, a hopper discharging into the receiving section, means in such hopper for agitating its contents near its discharge spout, a conveyer having an end located under said hopper and in the water, a table in the intermediate section, such table having transverse riffles, a chain of brushes supported for being moved longitudinally over said table, means for driving said brushes, said conveyer discharging onto the riffled table, and a second conveyer in the latter section, such conveyer adapted to receive the discharge from the riffled table.

9. In a washing machine of the character described, a trough, a table in the trough, such table having transverse riffles and apertures between the riffles, and a chain of driven brushes supported for being moved longitudinally over said table.

10. In a washing machine of the character described, a trough, a table in the trough, such table having transverse riffles and apertures between the riffles, a chain of driven brushes supported for being moved longitudinally over said table, the brushes moving in a plane spaced from the top of said table and toward the discharging section.

11. In a washing machine of the character described, a trough, a hopper discharging into the trough, means in such hopper for agitating its contents near its discharge spout, a conveyer having an end located under said hopper and in the water, a table having transverse riffles, and a chain of driven brushes supported for being moved longitudinally over said table, said conveyer discharging onto the riffled table.

12. In a washing machine of the character described, a trough, a hopper discharging into the trough, means in such hopper for agitating its contents near its discharge spout, a conveyer having an end located under said hopper and in the water, a table in the trough, such table having transverse riffles and apertures between the riffles, a chain of driven brushes supported for being moved longitudinally over said table, said conveyer discharging onto the riffled table.

13. In a washing machine of the character described, a trough, a hopper discharging into the trough, a conveyer having an end located under said hopper and in the water, a table having transverse riffles, and a chain of driven brushes supported for being moved longitudinally over said table, said conveyer discharging onto the riffled table, the brushes moving in a plane spaced from the top of said table.

14. In a washing machine of the character described, a trough, a hopper discharging into the trough, a conveyer having an end located under said hopper and in the water, a table having transverse riffles and apertures between the riffles, and a chain of driven brushes supported for being moved longitudinally over said table, said conveyer discharging onto the riffled table, the brushes moving in a plane spaced from the top of said table.

15. In a washing machine of the character described, a trough, a hopper discharging into the trough, a spiral conveyer having an end located under said hopper and in the water, the conveyer having a trough of conforming cross area and provided with draining apertures, a table having transverse riffles, and a chain of driven brushes supported for being moved longitudinally over said table.

16. In a washing machine of the character described, a series of three vats, means for a continuous feed of water in the vat located at the discharge end of the machine, means for maintaining the water levels in the three vats at progressive heights with the lowest level at the receiving end of the machine, a hopper over the receiving end of the machine, an agitator located at the spout of the hopper, a conveyer having its receiving end dipped in the water of the receiving vat under said hopper and adapted to discharge into the intermediate vat, a washing table located in the intermediate vat the upper surface of said table being provided with a series of transverse riffles, having slots between them, an endless carrier carrying a series of brushes adapted for brushing the nuts lying on said washing table, the brushes operating in coöperation with said riffles to turn the walnuts over and over on the washing table and also carrying the same toward the discharge end of the washing table, a spout adapted to carry the walnuts as discharged from the washing table into a conveyer located at the discharge end of the machine, said conveyer having one end dipped in the latter vat and operating to lift and discharge the nuts from said latter tank out of the machine.

17. In a washing machine of the character described, a trough, a table in the trough, provided with apertures, a series of driven brushes supported for being moved longitudinally over said table in a plane spaced from the top thereof, means on the table top serving to provide some resistance to the movement by the brushes of the fruit deposited on the table, and a water feeder for said trough adapted to maintain the water at a level covering said table, but below the plane of the working faces of said brushes.

FERDINAND GRONER.